United States Patent
de Groot et al.

(10) Patent No.: US 9,958,254 B2
(45) Date of Patent: May 1, 2018

(54) CALIBRATION OF SCANNING INTERFEROMETERS

(71) Applicant: Zygo Corporation, Middlefield, CT (US)

(72) Inventors: Peter J. de Groot, Middletown, CT (US); Jake Beverage, Manchester, CT (US); Xavier Colonna de Lega, Middlefield, CT (US); Martin F. Fay, Middletown, CT (US)

(73) Assignee: Zygo Corporation, Middlfield, CT (US)

( * ) Notice: Subject to any disclaimer, the term of this patent is extended or adjusted under 35 U.S.C. 154(b) by 145 days.

(21) Appl. No.: 14/822,975

(22) Filed: Aug. 11, 2015

(65) Prior Publication Data

US 2016/0047645 A1 Feb. 18, 2016

Related U.S. Application Data

(60) Provisional application No. 62/036,268, filed on Aug. 12, 2014.

(51) Int. Cl.
*G01B 9/02* (2006.01)
*G02B 21/00* (2006.01)

(52) U.S. Cl.
CPC ....... *G01B 9/02072* (2013.04); *G01B 9/0209* (2013.01); *G02B 21/002* (2013.01)

(58) Field of Classification Search
CPC .................................................. G01B 9/02072
See application file for complete search history.

(56) References Cited

U.S. PATENT DOCUMENTS 5,694,216 A 12/1997 Riza
7,428,057 B2 9/2008 de Lega et al.
(Continued)

FOREIGN PATENT DOCUMENTS

TW 201330055 7/2013 ........... H01L 21/027

OTHER PUBLICATIONS

Goodman, Joseph W. Introduction to Fourier optics. Roberts and Company Publishers, p. 51, 2005.*
(Continued)

*Primary Examiner* — Shawn Decenzo
(74) *Attorney, Agent, or Firm* — Fish & Richardson P.C.

(57) ABSTRACT

Calibrating a scanning interferometry imaging system includes: configuring the scanning interferometry imaging system for operation with an interference objective using light having a narrowband wavelength spectrum; using the scanning interferometry imaging system to direct measurement light and reference light along different paths and to overlap the measurement and reference light on a detector, the measurement and reference light having the narrowband wavelength spectrum; scanning an optical path length difference between the measurement light and the reference light at the detector while acquiring intensity data using the detector, the detector acquiring the intensity data at a frame rate and the scanning being performed at a scan speed; determining information about the scan speed based on the acquired intensity data, geometric information about the scanning interferometry imaging system, and the narrowband wavelength spectrum; and calibrating the scanning interferometry imaging system based on the information about the scan speed.

23 Claims, 7 Drawing Sheets

(56) References Cited

U.S. PATENT DOCUMENTS

| | | | |
|---|---|---|---|
| 8,004,688 B2 | 8/2011 | Davidson et al. | |
| 8,045,175 B2 | 10/2011 | de Groot et al. | |
| 2002/0196450 A1 | 12/2002 | Olszak et al. | |
| 2006/0158657 A1* | 7/2006 | De Lega | G01B 9/023 356/497 |
| 2006/0262321 A1* | 11/2006 | De Groot | G01B 11/2441 356/503 |
| 2007/0288121 A1 | 12/2007 | Shibazaki | |
| 2008/0266571 A1 | 10/2008 | Deck | |
| 2011/0026006 A1 | 2/2011 | Shibazaki | |
| 2014/0063506 A1 | 3/2014 | Kang et al. | |

OTHER PUBLICATIONS

ISO, "25178-604:2013(E): Geometrical product specification (GPS)—Surface texture: Areal—Nominal characteristics of non-contact (coherence scanning interferometry) instruments," (International Organization for Standardization, Geneva, 2013).

ISO, "WD 25178-600:2014(E): Geometrical product specifications (GPS)—Surface texture: Areal—Part 600: Metrological characteristics for areal-topography measuring methods," (International Organization for Standardization, Geneva, 2014).

de Groot et al., "Step height measurements using a combination of a laser displacement gage and a broadband interferometric surface profiler," Proc. SPIE, vol. 4778, pp. 127-130 (2002).

Giusca et al., "Calibration of the scales of areal surface topography measuring instruments: part 2. Amplification, linearity and squareness," Measurement Science and Technology, vol. 23, No. 6, 065005 (2012).

Greve et al., "Direct determination of the aperture correction factor of interference microscopes" Proceedings of the XI. International Colloquium on Surfaces Part 1, pp. 156-163 (2004).

Kim et al., "White Light Phase-Shifting Interferometry with Self-Compensation of PZT Scanning Errors," Proc. SPIE, vol. 3740, pp. 16-19 (Jun. 1999).

Kiyono et al., "Self-calibration of a scanning white light interference microscope" Optical Engineering, vol. 39, No. 10, pp. 2720-2725 (Oct. 2000).

Sansonetti et al., "Wavelengths of spectral lines in mercury pencil lamps," Applied Optics 35 (1), 74 (1996).

Schmit et al., "Calibration of high-speed optical profiler," Proc. SPIE, vol. 5180, pp. 355-364 (2003).

Schmit et al., "Surface Profilers, Multiple Wavelength, and White Light Intereferometry," in Optical Shop Testing, pp. 667-755, (John Wiley & Sons, Inc., 2006).

Sheppard et al., "Effect of numerical aperture on interference fringe spacing" Applied Optics, vol. 34, No. 22, pp. 4731-4734 (Aug. 1995).

Zhang et al., "In-situ Absolute Calibration of Interference Microscope" Proc. ASPE, pp. 448-451 (1999).

International Search Report and the Written Opinion of the International Searching Authority for International Application No. PCT/US2015/044695 dated Nov. 19, 2015 (18 pages).

Taiwan Office Action for TW Application No. 104126046 dated Aug. 9, 2016.

International Preliminary Report on Patentability and Written Opinion of the International Searching Authority for International Application No. PCT/US2015/044695 dated Feb. 23, 2017 (14 pages).

Taiwan Office Action for Taiwan Application No. 104126046 dated Apr. 5, 2017.

* cited by examiner

CALIBRATION OF SCANNING INTERFEROMETERS

CROSS-REFERENCE TO RELATED APPLICATIONS

This application claims priority to Provisional Application No. 62/036,268, filed on Aug. 12, 2014, the entire contents of which is incorporated herein by reference.

FIELD OF THE DISCLOSURE

This disclosure relates to scanning interferometers, such as scanning interference microscopes, and methods for their calibration.

BACKGROUND

Figure 1:
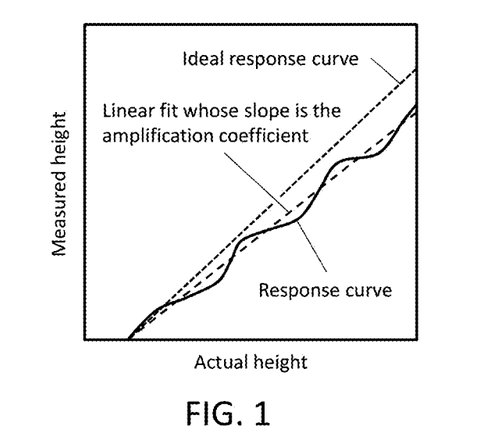
FIG. 1 is an illustrative height response curve, showing the actual response of an interferometry system, the response corrected for nonlinearity, and the ideal response curve.

The height response of a surface topography instrument (such as a scanning interference microscope) refers to the relationship between the height measured by the instrument and the actual height of a surface being measured. FIG. 1 shows a plot of a height response, showing the measured height on the vertical axis as a function of the actual height (horizontal axis). Ideally, the response is linear and with unit slope across the dynamic range of the instrument—i.e., the measured height is identical to the actual height, less a constant offset. In general, however, the response curve of a commercial instrument is non-linear and is typically characterized by an amplification coefficient and linear deviation (See, e.g., ISO, "WD 25178-600:2014(E): Geometrical product specifications (GPS)—Surface texture: Areal—Part 600: Metrological characteristics for areal-topography measuring methods," (International Organization for Standardization, Geneva, 2014)). The amplification coefficient refers to the slope of a linear fit to the non-linear response curve and the linear deviation refers to the deviation of the response curve from the linear fit at a given height. These parameters—the amplification coefficient and the linear deviation—may be determined for a particular instrument when calibrating the instrument.

Figure 2:
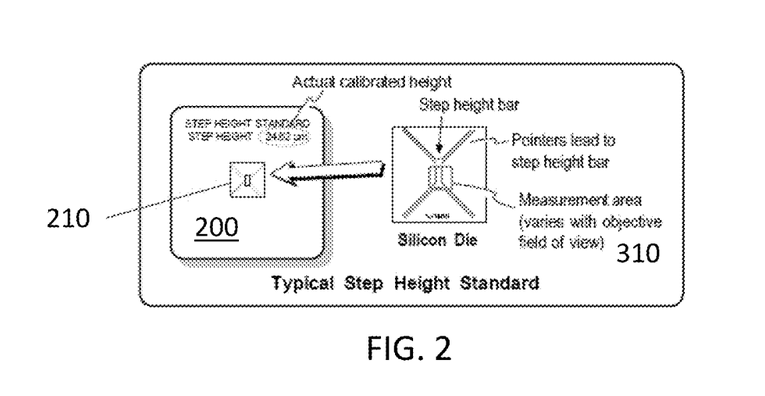
FIG. 2 is a schematic of a Step Height Standard (SHS) artifact (left) and its measurement (right).
Figure 3:
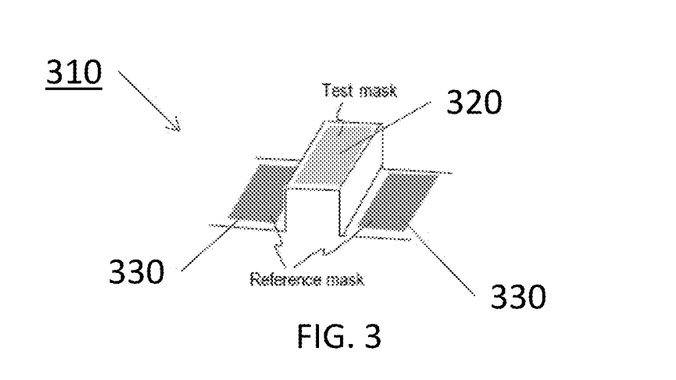
FIG. 3 is a perspective view of a step height standard.

Conventional methods for measuring height response include the use of material measures, the most common of which is a step-height standard ("SHS"), as shown in FIG. 2. Procedures are available to evaluate both the linearity and the amplitude coefficient using such material measures (See, e.g., C. L. Giusca, R. K. Leach and F. Helery, "Calibration of the scales of areal surface topography measuring instruments: part 2. Amplification, linearity and squareness," Measurement Science and Technology 23 (6), 065005 (2012)).

In many systems, such as coherence scanning interferometry (CSI sometimes known as scanning white light interferometry or SWLI) microscopes, focus sensing and confocal microscopes, the detection of local surface heights or other surface characteristics such as transparent film thickness relies on a scanning mechanism that mechanically displaces the microscope objective with respect to the sample object along the line of sight of the objective. In an interference microscope, this has the effect of scanning the optical path difference or OPD, which can also be achieved by scanning the reference mirror or otherwise adjusting the optical path. In a confocal or comparable focus-based system, the scanning mechanism moves the focus position in a controlled way. For these CSI, confocal and other scanning systems, the height response is directly linked to knowledge of the velocity and uniformity of motion of the scanning mechanism. Determining the rate and linearity of the scan motion is therefore fundamental to the determination of the amplitude coefficient and linear deviation of the height response. In common practice, the scan is assumed to be sufficiently linear by design, and the amplitude coefficient follows from a single SHS measurement.

Proposed alternatives to SHS measurement include the use of a laser interferometer operating in parallel (see, e.g., J. Schmit, M. Krell and E. Novak, "Calibration of high-speed optical profiler," 5180, 355-364 (2003); P. J. de Groot, X. Colonna de Lega and D. A. Grigg, "Step height measurements using a combination of a laser displacement gage and a broadband interferometric surface profiler," Proc. SPIE 4778, 127-130 (2002); S. Zhang, M. Kanai, W. Gao and S. Kiyono, "In-situ absolute calibration of interference microscope," Proc. ASPE, 448-451 (1999)) or through some or all of the same optics (see, e.g., M. Davidson, J. Liesener, P. de Groot, X. Colonna De Lega and L. L. Deck "Scan error correction in low coherence scanning interferometry", U.S. Pat. No. 8,004,688 (2011)). Alternatively, some methods for calibration of the linearity of interference microscopes propose to use the interferometer itself with a tilted flat so as to allow for single-camera frame determination of phase during a scan (see, e.g., S. Kiyono, W. Gao, S. Zhang and T. Aramaki, "Self-calibration of a scanning white light interference microscope," Optical Engineering 39 (10), 2720 (2000)). Similar methods provide a way to validate that the amplification coefficient has not changed over time once calibrated using an SHS (see, e.g., S.-W. Kim, M. Kang and S. Lee, "White light phase-shifting interferometry with self-compensation of PZT scanning errors," Proc. SPIE 3740, 16-19 (1999)).

SUMMARY

This disclosure relates to the calibration of interference microscopes (e.g., optical surface profiling microscopes), such as commercially-available microscopes from Zygo Corporation (Middlefield, Conn.), such as the NewView™ and Nexview™ lines of optical surface profilers. In some implementations, calibration is performed during manufacture of the interference microscope. Alternatively, or in addition, calibration is performed in the field, e.g., by a qualified service person, and/or by an end user of the interference microscope.

In some embodiments, microscope calibration involves calibrating a scanning mechanism of an objective on a coherence scanning interferometry (CSI) instrument. A first step in the calibration is to obtain an equivalent wavelength (also referred to as a calibration wavelength) in air traceable using a spectrometer to a primary length standard, such as $^{198}$Hg emission lines. In certain implementations, this involves combining a narrow-band (e.g., 3 nm) interference filter with a low magnification objective (e.g., 2.5×) and an aperture stop to establish and reduce the numerical aperture (NA) of the objective. The system acquires interference data during a scan of the objective and, using a data processing system, performs frequency analysis of the data along with other calculations for performing the calibration.

In some embodiments, systems for implementing the calibration procedure may include an integral spectrometer for recalibration, a light source for providing light at a reference wavelength (e.g., an $^{198}$Hg pencil lamp), and/or a specialized objective with integrated filter and aperture.

In certain implementations, calibration features a first step wherein the optical spectrum as viewed by the camera with the narrow-band filter in place, is determined using a spectrometer. Light for the spectrometer may be collected using an integrating sphere in place of the camera, for example. Practically, it may be sufficient and, in certain implementations, more convenient to place the integrating sphere in place of the object.

In a next step, with the narrow-band filter, low-magnification objective and aperture in place, the system acquires data over a sufficiently long PZT scan to entirely encompass the coherence envelope of the CSI signal (also referred to as a scanning white light interferometry, or SWLI, signal). A digital Fourier transform, averaged over many or all pixels, and possibly multiple data acquisitions, determines the peak frequency and in this way the speed of the objective scanning mechanism. Optionally, the same procedure provides a linearity value, over at least a portion of the scan that is within that portion of the fringe contrast envelope that has greater than 50% contrast.

Embodiments may include using a specialized objective with integrated filter and aperture.

In some embodiments, experimental calibration of geometrical properties of an interference objective, including, e.g., an obliquity factor, may be determined using a system that has a calibrated scan rate, rather than relying on a calculation of these properties.

Various aspects of the invention are summarized as follows.

In general, in a first aspect, the invention features a method of calibrating a scanning interferometry imaging system, including: configuring the scanning interferometry imaging system for operation with an interference objective using light having a narrowband wavelength spectrum; using the scanning interferometry imaging system to direct measurement light and reference light along different paths and to overlap the measurement and reference light on a detector, the measurement and reference light having the narrowband wavelength spectrum; scanning an optical path length difference between the measurement light and the reference light at the detector while acquiring intensity data using the detector, the detector acquiring the intensity data at a frame rate and the scanning being performed at a scan speed; determining information about the scan speed based on the acquired intensity data, geometric information about the scanning interferometry imaging system, and the narrowband wavelength spectrum; and calibrating the scanning interferometry imaging system based on the information about the scan speed.

Implementations of the method may include one or more of the following features and/or features of other aspects. For example, the interference objective can have a low numerical aperture (NA). The interference objective can have a NA of 0.1 or less (e.g., 0.08 or less, 0.06 or less, 0.05 or less, 0.04 or less, 0.03 or less, 0.02 or less, 0.01 or less).

The interference objective can have a magnification of 5× or less (e.g., 4× or less, 3× or less, 2× or less).

The interference objective can be an unobscured objective.

The geometric information can include a value for an obliquity factor for the interference objective. The method can include determining the value for the obliquity factor for the interference objective prior to calibrating the scanning interferometry imaging system.

The interference objective can be a Michelson objective.

The narrowband wavelength spectrum can have a full width half maximum (FWHM) of 5 nm or less (e.g., 4 nm or less, 3 nm or less, 2 nm or less).

The narrowband wavelength spectrum can include a pre-calibrated system wavelength. The system wavelength can be a traceable wavelength. In some embodiments, the method includes re-calibrating the pre-calibrated system wavelength using a traceable wavelength standard.

In some embodiments, configuring the scanning interferometry imaging system for operation with light having the narrowband wavelength spectrum can include filtering light from a broadband source to provide the narrowband wavelength spectrum. Filtering the light can include placing an interference filter in a path of the light.

Scanning the optical path length difference can include causing relative motion between a test object in a path of the measurement light and the low NA objective.

The optical path length difference can be scanned over a range that includes where the optical path length difference is zero. The range can exceed a coherence length of the light having the narrowband wavelength spectrum.

The detector can be a multi-element detector, and the intensity data can include an interference signal for each of at least some of the detector elements. Determining the information about the scan speed can include determining a fringe frequency for at least one of the interference signals. Determining the fringe frequency can include Fourier transforming the at least one interference signal.

The information about the scan speed can include a frame increment, the frame increment being an incremental displacement of a scanner used to scan the optical path length difference between successive frames of the detector.

The geometric information about the scanning interferometry system can be an obliquity value for the scanning interferometry imaging system. The obliquity value for the scanning interferometry imaging system configured for operation with the interference objective can be 1.01 or less (e.g., 1.005 or less, 1.003 or less, 1.001 or less).

Calibrating the scanning interferometry system can include establishing a height response for the scanning interferometry imaging system for subsequent measurements made using the scanning interferometry imaging system. Establishing the height response can include setting a value for an amplification coefficient of the height response based on the information about the scan speed.

In some embodiments, the method includes using the calibrated scanning interferometry imaging system to determine information about a test object. The calibrated scanning interferometry imaging system can be used with an objective different from the low NA objective used for calibrating the scanning interferometry imaging system, such as a high magnification, high NA objective.

The scanning interferometry imaging system can be a scanning interferometry microscope.

In general, in a further aspect, the invention features a scanning interferometry imaging system that includes: a light source module for providing light having a narrowband wavelength spectrum; an aperture stop; an interference objective; a detector for acquiring intensity information at a frame rate; one or more optical elements arranged to derive measurement light and reference light from the light source, to direct the test and reference light along different paths, and to overlap the test and reference light at the detector; an actuator for scanning an optical path length difference between the measurement light and the reference light at a scan speed; and a data processing apparatus in communication with the detector and the actuator, the electronic processing module being programmed acquire intensity data using the detector while scanning the optical path length difference, and determine information about the scan speed based on the acquired intensity data, geometric information about the scanning interferometry imaging system, and the narrowband wavelength spectrum, and calibrating the scanning interferometry imaging system based on the information about the scan speed.

Embodiments of the system may include one or more of the following features and/or features of other aspects. For example, the light source module can include a broadband light source and a filter, the filter being configured to provide the narrowband wavelength spectrum from the broadband light source. The filter can have a passband with a FWHM of 5 nm or less (e.g., 4 nm or less, 3 nm or less, 2 nm or less). The light source module can include an actuator for positioning the filter into and removing the filter from a path of light from the broadband light source.

The interference objective can be a low numerical aperture (NA) interference objective. The interference objective can have an NA of 0.1 or less (e.g., 0.08 or less, 0.06 or less, 0.05 or less, 0.04 or less, 0.03 or less, 0.02 or less, 0.01 or less).

The geometric information about the scanning interferometry imaging system can include a pre-established value for an obliquity factor for the interference objective. The obliquity factor can be 1.01 or less (e.g., 1.005 or less, 1.003 or less, 1.001 or less).

The interference objective can be a Michelson objective.

The interference objective can be an unobscured objective.

The scanning interferometry imaging system can be a scanning interferometry microscope.

In general, in another aspect, the invention features a non-transitory computer readable medium encoded with instructions that when executed by a data processing apparatus cause the data processing apparatus to perform operations including: scanning an optical path length difference between measurement light and reference light at a detector, where the measurement and reference light is light derived from a common source and directed along different paths before being overlapping on the detector using a scanning interferometry imaging system, the measurement and reference light having a narrowband wavelength spectrum; acquiring intensity data using the detector while scanning the optical path length difference, the intensity data being acquired at a frame rate and the scanning being performed at a scan speed; determining information about the scan speed based on the acquired intensity data, geometric information about the scanning interferometry imaging system, and the narrowband wavelength spectrum; and calibrating the scanning interferometry imaging system based on the information about the scan speed.

Embodiments of the system may include one or more features of other aspects.

In general, in another aspect, the invention features a non-transitory computer readable medium encoded with instructions that when executed by a data processing apparatus cause the data processing apparatus to perform operations including: scanning an optical path length difference between measurement light and reference light at a detector, where the measurement and reference light is light derived from a common source and directed along different paths before being overlapping on the detector using a scanning interferometry imaging system, the measurement and reference light having a narrowband wavelength spectrum; acquiring intensity data using the detector while scanning the optical path length difference, the intensity data being acquired at a frame rate and the scanning being performed at a scan speed; determining information about the scan speed based on the acquired intensity data, geometric information about the scanning interferometry imaging system, and the narrowband wavelength spectrum; and calibrating the scanning interferometry imaging system based on the information about the scan speed.

Embodiments of the non-transitory computer readable medium may include one or more features of other aspects.

In general, in a further aspect, the invention features a method of calibrating an scanning interferometry imaging system having a broadband light source, including: providing an interference objective in an optical path of the scanning interferometry imaging system; directing light from the broadband light source through a light path of the scanning interferometry imaging system to a spectrometer, wherein directing the light comprises filtering broadband light from the broadband light source to provide narrowband light at the spectrometer; measuring a wavelength spectrum of the narrowband light using the spectrometer; recording a calibration wavelength based on the measured wavelength spectrum; and calibrating a height response of the scanning interferometry imaging system based on the calibration wavelength and an obliquity factor for the scanning interferometry system with the interference objective.

Implementations of the method can include one or more of the following features and/or features of other aspects. For example, the method may include calibrating the spectrometer prior to measuring the wavelength spectrum. The spectrometer may be calibrated based on a light from a traceable source, such as a $^{198}$Hg source.

Among other advantages, the disclosed calibration techniques may provide improved uncertainty with respect to the conventional SHS method. For example, a SHS-calibrated areal surface topography system is commonly assigned an uncertainty of 0.5% to 1%. It is believed that the disclosed techniques may provide uncertainty of 0.1% or less (e.g., 0.05% or less).

BRIEF DESCRIPTION OF THE DRAWINGS

Understanding of the disclosure will be facilitated by consideration of the following detailed description in conjunction with the accompanying drawings, in which like numerals refer to like parts and in which.

DETAILED DESCRIPTION

Figure 4:
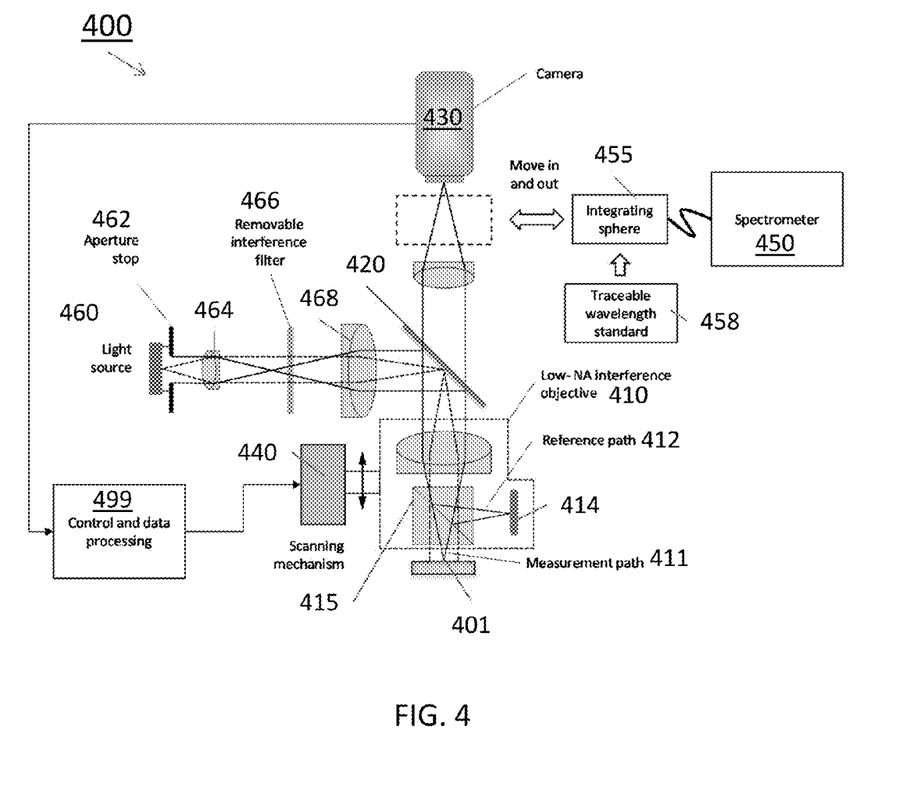
FIG. 4 is a schematic diagram of an apparatus for CSI equipped for in situ calibration based on an aperture stop, a low-magnification objective and a calibrated, traceable central wavelength associated with a narrow-bandwidth illumination spectrum.

Referring to FIG. 4, a scanning interferometry imaging system 400 for providing interferometric areal surface measurements of a test object 401 is shown. System 400 uses coherence scanning interferometry with traceable in-situ interferometric calibration, which is described in detail below. System 400 includes a light source 460 (e.g., a broadband light source, such as a superluminescent diode), a beamsplitter 420, an interference objective 410, and a camera 430. Optical elements 464 and 468 relay light from light source 460 to beam splitter 420, which directs the light towards interference objective 410. Interference objective 410 includes a beam splitter 415 and a reference object 414. Beam splitter 415 splits light from beam splitter 420, reflecting some of the light along a reference path 412, and transmitting some of the light along a measurement path 411 to test object 401. Beam splitter 415 recombines light reflected from test object 401 with light reflected from reference object 414 and directs the combined light to camera 430. System 400 includes optical elements, including interference objective 410, such that the surface of test object 401 is imaged onto camera 430.

System 400 also includes a scanning mechanism 440 (e.g., a piezoelectric actuator) which scans the relative position between test object 401 and interference objective 410 during operation of the system. Both camera 430 and scanning mechanism 440 are under control of a control and data processing module 499 (e.g., a PC computer).

As configured for in-situ calibration, interference objective 410 is a low-magnification objective 410 (e.g., up to 5×, such as 3× or 2×) and system 400 further includes an aperture stop 462 for establishing a known, low numerical aperture NA (e.g., less than 0.1, such as 0.06 or less, 0.05 or less, 0.04 or less, 0.03 or less, 0.02 or less). Note that while aperture stop 462 is adjacent the light source as shown, more generally the stop may be alternatively positioned in other parts of the imaging system. System 400 also includes a removable interference filter 466 for providing a reproducible narrow band (e.g., 0.1 nm to 5 nm) optical illumination spectrum from a light source 460 that has a broader optical spectrum (e.g., an LED). In certain embodiments, system 400 is equipped with motorized apertures and filters for positioning these components in and out of the light path of system 400.

Figure 5:
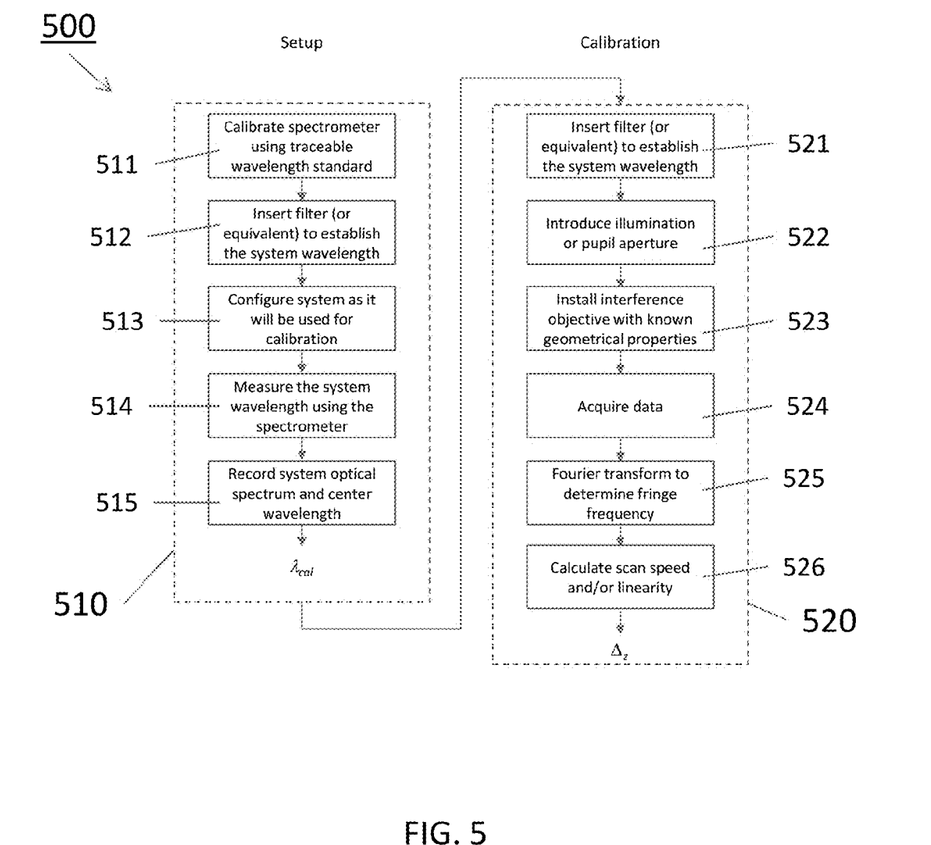
FIG. 5 is a flowchart of an implementation of a method for setup and calibration.

Referring also to FIG. 5, calibration 500 of system 400 involves an initial setup 510 and an in-situ calibration sequence 520. For the purposes of the initial setup, system 400 also includes an integrating sphere 455, which may be moved in and out of the light path of system 400, a spectrometer 450, and a traceable wavelength standard 458. Initial setup 510 is performed, e.g., prior to delivery of system 400 to the end user, and then from time-to-time thereafter (e.g., during periodic field maintenance as needed). Initial setup 510 is performed in order to establish a traceable calibrated central emission wavelength, $\lambda_{cal}$, for system 400. In-situ calibration sequence 520 is performed with greater frequency (e.g., once a month, each time system 400 is started up, or each time a new sample is measured) and is used to establish or confirm an amplification coefficient $\Delta_z$ for system 400.

Initial setup 510 involves five principal operational steps in which, integrating sphere 455, traceable wavelength standard 458, and spectrometer 450 are used to determine the illumination characteristics in terms of $\lambda_{cal}$ for the system 400. In a first step 511, spectrometer 450 is calibrated using traceable wavelength standard 458, which may be, for example, a mercury lamp providing $^{198}$Hg emission lines. Once spectrometer 450 has been calibrated, the spectrometer is used in the initial setup 510 as follows. First, in step 512, interference filter 466 (or an equivalent spectral filter) is inserted into the light path in system 400 to limit the spectral composition of light downstream in system 400 and increase the coherence length of the test and reference light at camera 430 relative to the coherence length of the light during regular operation of the system.

In general, the bandwidth of the interference filter is relatively narrow. For example, the full-width half maximum (FWHM) may be 5 nm or less (e.g., 3 nm or less, 2 nm or less). More generally, other types of spectral filters may be used. For example, filtering can be performed using diffractive or refractive optics combined with apertures as in a spectrometer, a birefringent material sandwiched between polarizers, absorptive filters, fluorescence or other reemission techniques.

Next, in step 513, system 400 is configured as it will be configured for in-situ calibration. In particular, an illumination or pupil aperture is introduced to reduce the numerical aperture at the test object to a pre-established, known NA, and objective 410 installed in the light path.

In step 514, spectrometer 450 (now calibrated using the traceable standard, as discussed above), is used to measure the wavelength of the light transmitted by interference filter 466. In this step, spectrometer 450 is positioned as close as practical to camera 430, with test object 401 having a broad spectral reflectivity in place, so as to account for the transmission properties of system 400. In some embodiments, it is sufficient to measure the spectrum of the light transmitted by objective 410 to test object 401. In other words, integrating sphere 455 may be positioned at the location of test object 401 as shown in FIG. 4, in order to collect the light transmitted by objective 410.

In step 515, the system optical spectrum and center wavelength, $\lambda_{cal}$, are recorded. The wavelength $\lambda_{cal}$ is stored by system 400 for use later during in-situ calibration 520. Step 515 may include an accounting for other factors that can influence the spectrum as viewed by the camera. For example, these factors may include the wavelength dependent sensitivity of camera 430, spectral filtering characteristics of one or more components in the system, such as protective windows, that might be between the camera and the integrating sphere 455. In some embodiments, the calibration wavelength is selected so as to be near a position in the wavelength-dependent sensitivity of the camera that is as flat as possible, so that the camera influence is reduced (e.g., minimized). For example, for most visible-wavelength cameras, green light (e.g., $\lambda_{cal}$ of 550 nm or another wavelength in the range from about 535 nm to about 565 nm) would be appropriate.

Before turning to the specific steps involved in in-situ calibration 520, it is instructive to consider certain principles upon which the calibration is based. Ultimately, the purpose of in-situ calibration is to determine the scan rate or linearity of the system response. Calibrating the average scan rate provides a direct measure of the height response of the instrument overall. One measure of these parameters is $\Delta_z$, which is the distance traveled by the scanner between camera frames. To calculate $\Delta_z$ from interference data, one needs to know the equivalent wavelength $\Lambda_{cal}$ of the interference pattern, which may be different from the calibration spectral wavelength $\lambda_{cal}$ because of geometric effects of the system.

These geometric effects may be summarized by the obliquity factor $\Omega$ (see, e.g., Shepard and Larkin, "Effect of numerical aperture on interference fringe spacing," Applied Optics 34(22), 4731 (1995)). In many scanning interferometry imaging systems, the data acquisition scan involves a relative motion between the objective and the part under test. It is the range of incident angles on the test part that in this case results in the obliquity factor, and these angles are determined primarily by the objective and the distribution of light within the pupil of the objective. In system 400, the light distribution in the objective pupil is limited by illumination aperture 462, which is selected to keep the NA low. In more common usage, the illumination fully fills the pupil aperture built into the objective itself (not shown because not used in FIG. 4). This is the situation that corresponds to the NA value stamped on the objective housing. It is assumed here that the imaging system does not introduce vignetting, angle-apodization or aperture stops that would dominate the aperture defined in the illumination system. However, more complex cases can be accommodated with system modeling.

The equivalent wavelength $\Lambda_{cal}$ is equal to the product of the calibration spectral wavelength $\lambda_{cal}$ and of the obliquity factor $\Omega$:

$$\Lambda_{cal} = \Omega \lambda_{cal} \quad (1)$$

Using objective 410 (i.e., a low magnification interference objective without obscuration—Mirau objectives have an undesirable central obscuration) is one way to accommodate the obliquity factor when performing the in-situ calibration, along using aperture stop 462 to an illumination aperture to define and minimize the NA. Assuming stability of the scanning mechanism over time and with varying loads, it is not necessary to calibrate system 400 with a different objective that is employed for later measurements of sample parts.

In an ideal imaging system having no geometrical contributions to the calibration wavelength, the NA would be zero and the obliquity value would be equal to 1. A suitable calculation for non-zero NA (as disclosed by Shepard and Larkin, 1995) is $$\Omega = \frac{3}{2}\left(\frac{1 - \cos^2(\alpha)}{1 - \cos^3(\alpha)}\right) \quad (2)$$

where $$\alpha = \sin^{-1}(A_N) \quad (3)$$

and $A_N$ is the numerical aperture (NA) of the illumination, including the aperture stop. Using removable aperture stop 462 to reduce $A_N$ to a small value, for example, less than 0.06, thus facilitates a reduction in the uncertainty contribution of the obliquity effect. This calculates to an obliquity factor that can differ from 1 by less than 0.001, for example, which results in low uncertainty. Table 1 provides example combinations of objectives and example aperture sizes (large and small), with their associated obliquity factors, assuming that the illumination aperture is entirely and uniformly filled by the image of the light source.

TABLE 1

Obliquity factors for the objectives and aperture stops for the inventive calibration method.

| Type | Focal length | Stop | Pupil Ø (mm) | NA | $\Omega$ |
|---|---|---|---|---|---|
| 2X | 100.0 | large | 4.7 | 0.023 | 1.00014 |
|  | 100.0 | small | 2.9 | 0.014 | 1.00005 |
| 2.5X | 80.0 | large | 4.7 | 0.029 | 1.00021 |
|  | 80.0 | small | 2.9 | 0.018 | 1.00008 |
| 5X | 40.0 | large | 4.7 | 0.059 | 1.00086 |
|  | 40.0 | small | 2.9 | 0.036 | 1.00032 |

Thus, the first steps in in-situ calibration 520 involve configuring the optical components in system 400 similar to the configuration used in setup 510, however calibration measurements are performed using only camera 430; spectrometer 450, integrating sphere 455, and traceable wavelength standard 458 are not required. In other words, these components need not be included in system 400 as delivered to the end user but the user can still gain the benefit of the disclosed calibration methods without these additional components.

Configuring the optical components involves, in step 521, inserting interference filter 466 (or equivalent) to limit the spectral bandwidth of light delivered to objective 410 and camera 430. Also, in step 522, the numerical aperture of the system is stopped down using aperture stop 462 to have the same NA as used in setup 510. Further, in step 523, objective 410 is positioned in the light path of system 400.

Figure 6:
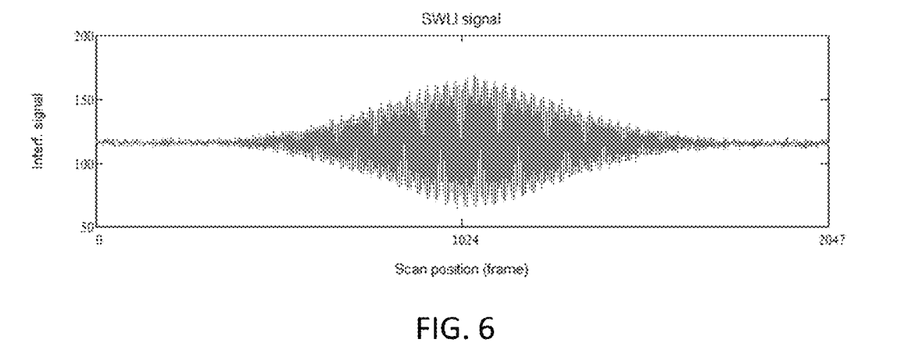
FIG. 6 is a plot showing an exemplary raw CSI signal for a single pixel.

In a next step 524, system 400 is commanded by control and data processing computer 499 to acquire interference data $I_z(x,y)$ for object surface coordinates (x,y) from camera 430 during a mechanical scan of interference objective 410 with respect to test object 401. Here, test object 401 may be a reference standard, or any sample that has a polished, uniform and nominally flat surface, including the object under test, if the object meets these criteria. FIG. 6 shows an example signal for a single pixel. In particular, this plot shows the intensity of the light at the pixel of camera 430 as a function of scan position (in frames).

Referring again to flow chart 500 in FIG. 5, the next step 525 involves data processing the acquired interference data to determine the Fourier coefficient magnitudes P for the positive, non-zero portion of the frequency spectrum for each field position (x,y).

$$P_v(x,y) = |q_v(x,y)| \quad (4)$$

where the Fourier coefficients are $$q_v(x, y) = \sum_{z=0}^{N-1} I_z(x, y)\exp(2\pi i v z) \quad (5)$$

and the frequencies v=1, 2 . . . (N/z−1) are units of interference fringes per scan length (=cycles/trace), for a total of N intensity samples I indexed by camera frame number z. Generally, the scan length should be sufficient to encompass the entire coherence envelope of the signal, as indicated in FIG. 6.

However, in some embodiments, the acquisition is over a subset of the coherence length, with a software data window using any one of the techniques well-known in the art.

Figure 7:
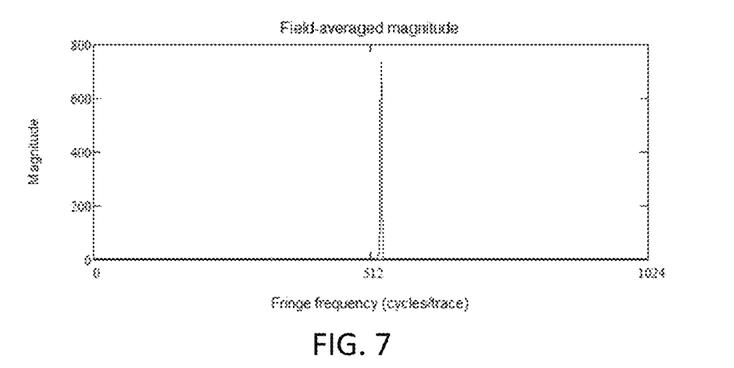
FIG. 7 is a plot showing the Fourier magnitude spectrum corresponding to the CSI data of FIG. 6, after averaging over a full field of view (in this case, 400 pixels).

The analysis may field average the Fourier magnitude spectra over several or all camera pixels:

$$\overline{P}_v = \frac{1}{XY} \sum_{j=0}^{Y-1} \sum_{i=0}^{X-1} P_v(x_i, y_j) \qquad (6)$$

where XY is the total number of pixels in the X and Y directions. FIG. 7 illustrates an example of a field-averaged magnitude spectrum from experimental data corresponding to the CSI data in FIG. 6.

Step 525 further involves locating and centroiding the Fourier peak. Typically, because the light is narrowband light, there are not many frequency bins so centroiding generally requires including a few bins to either side of the peak to avoid biasing the result because of the limited number of discrete frequency bins. An exemplary approach is to search from the left until a first point that exceeds a threshold value based on a percentage, for example 10%, of the strongest magnitude value is located, to establish a lower limit for magnitude values above this threshold. The same procedure sets a higher limit.

Once the Fourier peak is located, the next operation is centroiding. Because the final interference signal is the result of an incoherent sum of component signals of magnitude P, centroiding also involves the magnitudes as opposed to the magnitudes squared, even though the noise statistics may be better for the latter. The formula is therefore $$v_{cntr} = \frac{\sum_{v=v_{min}}^{v_{max}} v \overline{P}_v}{\sum_{v=v_{min}}^{v_{max}} \overline{P}_v} \qquad (7)$$

Figure 8:
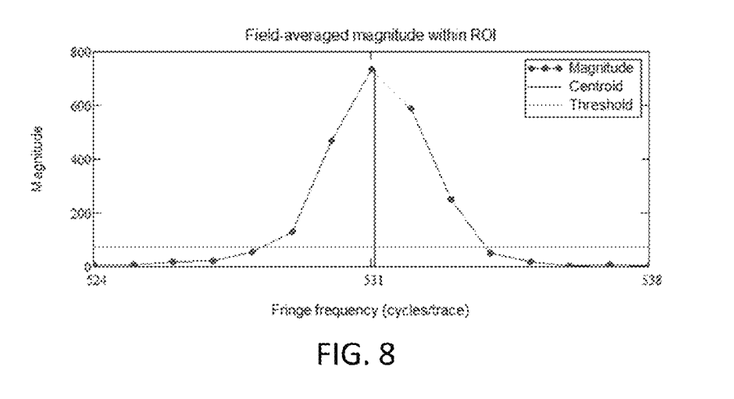
FIG. 8 is a plot showing a magnitude spectrum within the region of interest (ROI) together with the centroid position, for the spectrum shown in FIG. 7. In this example, the centroid is at 531.095 fringes for a 2048 camera frame acquisition.

FIG. 8 shows an example magnitude spectrum with the resulting centroid $v_{cntr}$ calculated with the ROI window.

Once the centroid is determined in units of cycles/trace, the next step (step 526 in FIG. 5) is to determine the scan speed, which is a quantity directly related to the height response of the instrument when measuring surface topography. One way to express the scan speed is as the distance traveled between camera frame acquisitions:

$$\Delta_z = \frac{\Omega \lambda_{cal} v_{cntr}}{2N} \qquad (8)$$

Other ways to determined $\Delta_z$ are also contemplated. For example, one can include a velocity expressed for example in microns per second, which follows from Eq. (8) multiplied by the camera frame rate at the time of calibration.

Figure 9:
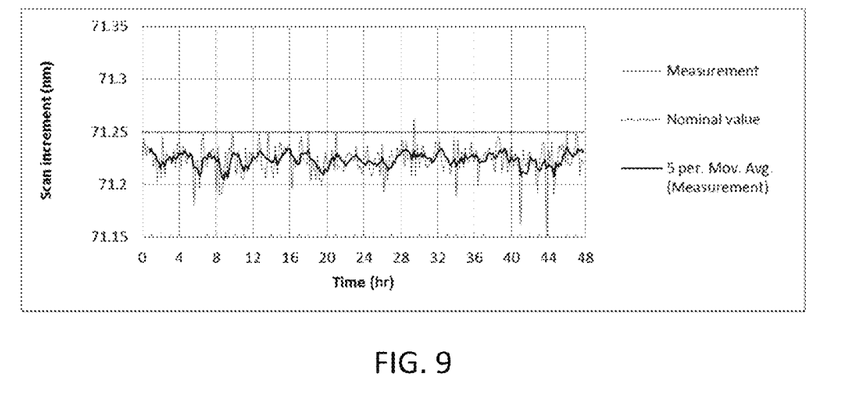
FIG. 9 is a plot of scan increment as a function of time showing results of calculations of the frame increment using a CSI type interference microscope. Nominal scan increment is 71.25 nm and the measured values and 5 per. moving average are shown.

FIG. 9 shows a plot of scan increment value as a function of time, illustrating an example repeatability test for 240 measurements of $\Delta_z$ taken over 48 hours. The thin solid line is for single measurements every 12 minutes using the in-situ calibration method described above with respect to FIG. 5, while the dark line is a moving average to show the expected data scatter with 5 averages. The bias with respect to the nominal value of 71.25 nm is 0.035%.

The calibration data additionally provide information regarding the linearity of the scan motion, by inverse transforming the field-averaged, positive frequency spectrum $\overline{q}_v$ to generate complex phase values as a function of scan position.

System 400, once calibrated in this way, is then reconfigured to perform surface analysis of test object 401, for example, areal surface topography measurement. An example of CSI-based areal surface topography measurement involves the determination of the peak fringe contrast position as a function of object coordinate (x,y). For instance, data processing for such measurements can include determining the camera frame in a signal trace for which the signal contrast is highest. The local height is then determined as the frame value multiplied by the value $\Delta_z$ previously determined using Eq. (8). This example illustrates how the calibration of the speed of the scanning mechanism influences directly the amplitude coefficient for the height response of the instrument.

For subsequent measurements of test object 401, it is not necessary to use the same optical spectrum or objective as for the calibration of the scanning mechanism. For example, subsequent measurements may be performed with removal of interference filter 466 from the light path, opening up aperture stop 462, and/or replacing interference objective 410 with a different objective, such as a higher NA, higher magnification objective. In some embodiments, low NA objective 410 is replaced with a Mirau objective having a high NA (e.g., 0.3 or more, 0.5 or more) and a high magnification (e.g., 50× or more, 100× or more).

While system 400 in FIG. 4 shows an exemplary system for implementing wavelength-based determination of the amplification coefficient in a scanning interferometry imaging system with incoherent illumination, other implementations are also possible. In embodiments, systems configured to use the calibration technique will include the narrow-band filter and an aperture stop, along with a means for calibrating the optical spectrum (such as a spectrometer and traceable reference), and a low-magnification objective such as the 2.5× or 2.75×.

Figure 10:
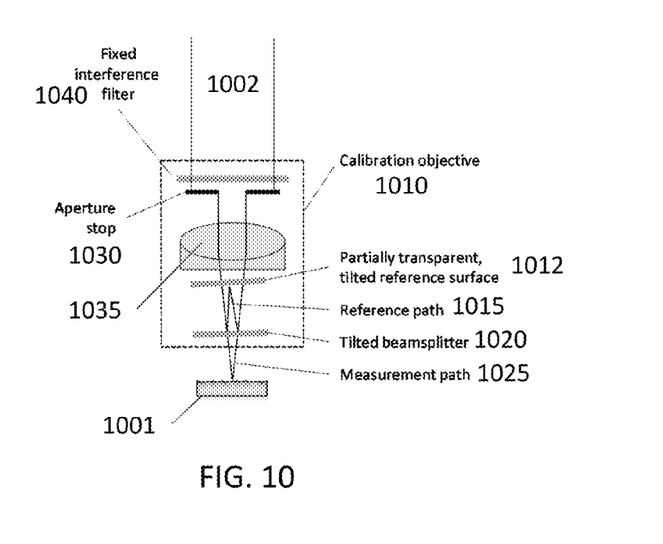
FIG. 10 is a schematic diagram of an embodiments of a specialized objective with integrated aperture and interference filter for use in automated calibration.

Referring to FIG. 10, in certain embodiments, a Mirau objective 1010 can be used instead of, or in addition to, objective 410 in system 400. Objective 1010 may be used in systems that may not have illumination apertures (e.g., aperture stop 462) nor means to position reproducibly reliable interference filters (e.g., interference filter 466) or other means to define the optical spectrum. Objective 1010 is positioned to receive light 1002 and includes a fixed interference filter 1040 for defining the optical spectrum of this light, together with a fixed aperture stop 1030 to define a low NA with a precisely-defined entrance and exit pupil aperture. Focusing optics 1035 focus light transmitted by aperture stop 1030 onto a test object 1001. A beam splitter 1020, tilted with respect to the optical axis of focusing optics 1035 (e.g., but 5° or less), reflects a portion of the light and transmits another portion. The reflected light is reference light which propagates along a reference path 1015 to a partially transparent reference surface 1012, which is also tilted with respect to the optical axis of focusing optics 1035 (e.g., 5° or less). The transmitted light is measurement light which propagates along a measurement path 1025.

In some embodiments, calibration is performed by affixing objective 1010 to the scanning stage, performing the calibration as discussed previously, then removing objective 1010 and replacing it with a measurement objective according to the user's application. This approach can be used to calibrate dimensional metrology systems that employ a scanning mechanism, for example, confocal, focus sensing and structured illumination microscopy. See, e.g., Schmit, J., Creath, K., and Wyant, J. C., "Surface Profilers, Multiple Wavelength, and White Light Interferometry," in Optical Shop Testing, pp. 667-755, John Wiley & Sons, Inc. (2006).

Figure 11:
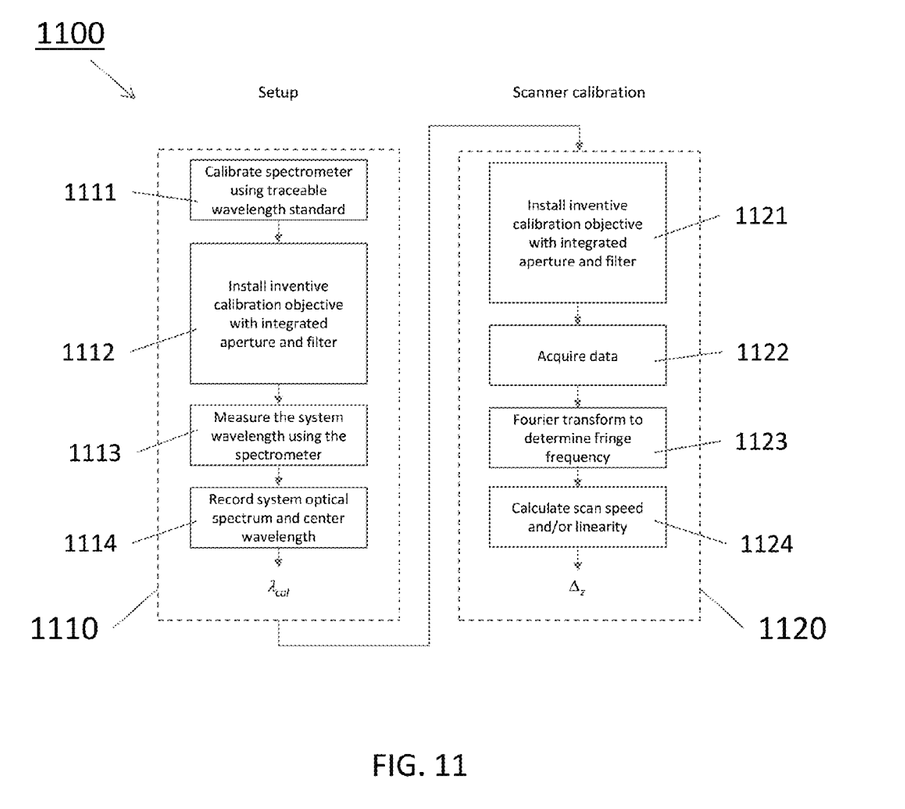
FIG. 11 is a flowchart showing a further implementation of a method for setup and calibration.

Referring to FIG. 11, an calibration technique 1100 using Mirau objective 1010 is shown. Technique 1100 involves a setup calibration 1110 and scanner calibration 1120. Setup calibration 1110 begins with calibrating the spectrometer using a traceable wavelength standard (1111), as described with respect to FIG. 5, above. Next, Mirau objective 1010 is installed in the system (1112) and the system wavelength is measured using the spectrometer (1113). The optical spectrum is recorded and the center wavelength determined (1114) to provide $\lambda_{cal}$.

Scanner calibration (1120) proceeds similar to calibration 520 disclosed previously, except that Mirau objective 1010, having an integrated aperture and filter, is installed (1121) to configured the system for calibration. The remaining steps of acquiring data (1122), determining fringe frequency (1123), and calculating scan speed and/or linearity (1124) proceed as described above.

Figure 12:
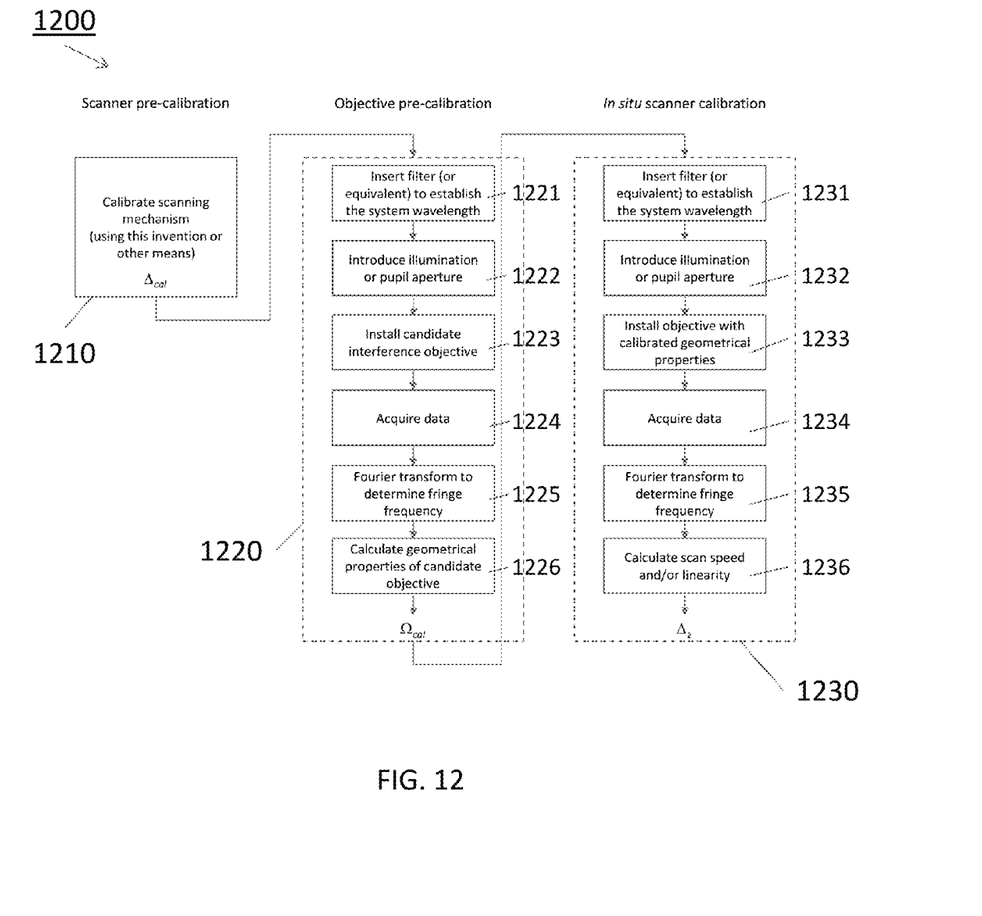
FIG. 12 is a flowchart showing a further implementation of a method for pre-calibration and in situ calibration.

Other implementations of the calibration technique are also possible. For example, while the technique discussed above involves the use of a low magnification objective, other implementations may allow for the use of higher magnification interference objective. For example, in some embodiments, the contribution of the geometric properties to the equivalent wavelength $\Lambda_{cal}$, including in particular the obliquity factor $\Omega$ may be determined by prior experiment. Referring to FIG. 12, for example, a method 1200 includes a first step (1210) the scanning stage is calibrated using a low NA objective as described above with reference to FIG. 5, or by any other means that accurately determines a pre-calibrated scan increment $\Delta_{cal}$ between camera frames (this is referred to more generally as $\Delta_z$ in FIG. 5 above). Next, the candidate interference objective is pre-calibrated to determine an obliquity factor, $\Omega_{cal}$, therefore (1220). Thereafter, the system can subsequently be calibrated in-situ to provide accurate values for $\Delta_z$ (1230).

Objective pre-calibration 1220 proceeds as follows. The narrowband filter is installed in the system to establish the system wavelength (1221), the aperture is introduced into the system as described previously (1222), and the candidate interference objective is installed (1223). The system then acquires data while scanning the optical path length difference between the measurement and reference light (1224), using a calibrated wavelength $\lambda_{cal}$. After Fourier Transforming (1225) to determine the frequency $v_{cntr}$ as given in Eq. (7), the calculated obliquity factor $\Omega_{cal}$ for this specific objective is determined (1226) as $$\Omega_{cal} = \frac{2N\Delta_{cal}}{\lambda_0 v_{cntr}} \tag{9}$$

where it is recalled that $v_{cntr}$ is in units of cycles/trace or the equivalent, while N is the number of camera frames per trace, and "trace" refers to the complete data acquisition. The value $\Omega_{cal}$, once determined, is permanently associated with the specific objective and instrument configuration employed for the determination of $\Omega_{cal}$, including the illumination aperture, the wavelength $\lambda_{cal}$ and any other relevant factors.

In subsequent measurements, a recalibration of the scan step $\Delta_z$ is possible at any time using the calibrated objective using $$\Delta_z = \frac{\Omega_{cal}\lambda_0 v_{cntr}}{2N} \tag{10}$$

as set forth using steps 1231-1236. With the exception of step 1233, where the pre-calibrated objective is used instead of objective 410, these steps are the same as steps 521-526, respectively, described previously.

The calibration techniques disclosed above can be implemented in computer programs using standard programming techniques following the method and figures described herein. Program code is applied to input data to perform the functions described herein and generate output information. The output information may be applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM, optical disc or magnetic disc) readable by a general or special purpose programmable computer, for configuring and operating the computer when the storage media or device is read by the computer to perform the procedures described herein. The computer program can also reside in cache or main memory during program execution. The calibration method can also be implemented, at least in part, as a computer-readable storage medium, configured with a computer program, where the storage medium so configured causes a computer to operate in a specific and predefined manner to perform the functions described herein.

Interferometry systems calibrated according to the disclosed techniques may be used for a variety of surface analysis problems, including analysis of: simple thin films; multilayer thin films; sharp edges and surface features that diffract or otherwise generate complex interference effects; unresolved surface roughness; unresolved surface features, for example, a sub-wavelength width groove on an otherwise smooth surface; dissimilar materials; polarization-dependent properties of the surface; and deflections, vibrations or motions of the surface or deformable surface features that result in incident-angle dependent perturbations of the interference phenomenon.

A number of embodiments have been described. Other embodiments are in the following claims.

What is claimed is:
1. A method of calibrating a scanning interferometry imaging system, comprising:
configuring the scanning interferometry imaging system for operation with an interference objective using light having a narrowband wavelength spectrum;
using the scanning interferometry imaging system to direct measurement light and reference light along different paths and to overlap the measurement and reference light on a detector, the measurement and reference light having the narrowband wavelength spectrum;

scanning an optical path length difference between the measurement light and the reference light at the detector while acquiring intensity data using the detector, the detector acquiring the intensity data at a frame rate and the scanning being performed at a scan speed;

determining information about the scan speed based on the acquired intensity data, geometric information about the scanning interferometry imaging system, and the narrowband wavelength spectrum; and calibrating the scanning interferometry imaging system based on the information about the scan speed, wherein, during the scanning, the measurement light reflects from an object and the scanning interferometry imaging system is arranged to image the object to the detector.

2. The method of claim 1, wherein the interference objective has a low numerical aperture (NA).

3. The method of claim 2, wherein the interference objective has a NA of 0.06 or less.

4. The method of claim 1, wherein the interference objective has a magnification of 5× or less.

5. The method of claim 1, wherein the interference objective is an unobscured objective.

6. The method of claim 1, wherein the geometric information comprises a value for an obliquity factor for the interference objective.

7. The method of claim 6, further comprising determining the value for the obliquity factor for the interference objective prior to calibrating the scanning interferometry imaging system.

8. The method of claim 1, wherein configuring the scanning interferometry imaging system for operation with light having the narrowband wavelength spectrum comprises filtering light from a broadband source to provide the narrowband wavelength spectrum.

9. The method of claim 1, wherein scanning the optical path length difference comprises causing relative motion between the object in a path of the measurement light and the low NA objective.

10. The method of claim 1, wherein the optical path length difference is scanned over a range that includes where the optical path length difference is zero.

11. The method of claim 1, wherein the detector is a multi-element detector, and the intensity data comprises an interference signal for each of at least some of the detector elements.

12. The method of claim 1, wherein the information about the scan speed comprises a frame increment, the frame increment being an incremental displacement of a scanner used to scan the optical path length difference between successive frames of the detector.

13. The method of claim 1, wherein the geometric information about the scanning interferometry system is an obliquity value for the scanning interferometry imaging system.

14. The method of claim 1, wherein calibrating the scanning interferometry system comprises establishing a height response for the scanning interferometry imaging system for subsequent measurements made using the scanning interferometry imaging system.

15. A method of calibrating a scanning interferometry imaging system, comprising:

configuring the scanning interferometry imaging system for operation with a low NA interference objective using light having a narrowband wavelength spectrum;

using the scanning interferometry imaging system to direct measurement light and reference light along different paths and to overlap the measurement and reference light on a detector, the measurement and reference light having the narrowband wavelength spectrum;

scanning an optical path length difference between the measurement light and the reference light at the detector while acquiring intensity data using the detector, the detector acquiring the intensity data at a frame rate and the scanning being performed at a scan speed;

determining information about the scan speed based on the acquired intensity data, geometric information about the scanning interferometry imaging system, and the narrowband wavelength spectrum;

calibrating the scanning interferometry imaging system based on the information about the scan speed; and using the calibrated scanning interferometry imaging system to determine information about a test object, wherein the calibrated scanning interferometry imaging system is used with an objective different from the low NA interference objective used for calibrating the scanning interferometry imaging system.

16. A scanning interferometry imaging system, comprising:

a light source module for providing light having a narrowband wavelength spectrum;

an aperture stop;

an interference objective;

a detector for acquiring intensity information at a frame rate;

one or more optical elements arranged to derive measurement light and reference light from the light source, to direct the measurement and reference light along different paths, and to overlap the measurement and reference light at the detector module;

an actuator for scanning an optical path length difference between the measurement light and the reference light at a scan speed; and a data processing apparatus in communication with the detector and the actuator, the electronic processing module being programmed acquire intensity data using the detector while scanning the optical path length difference, and determine information about the scan speed based on the acquired intensity data, geometric information about the scanning interferometry imaging system, and the narrowband wavelength spectrum, and calibrating the scanning interferometry imaging system based on the information about the scan speed wherein, during the scanning, the measurement light reflects from an object and the scanning interferometry imaging system is arranged to image the object to the detector module.

17. The scanning interferometry imaging system of claim 16, wherein the light source module comprises a broadband light source and a filter, the filter being configured to provide the narrowband wavelength spectrum from the broadband light source.

18. The scanning interferometry imaging system of claim 16, wherein the interference objective is a low numerical aperture (NA) interference objective.

19. The scanning interferometry imaging system of claim 16, wherein the geometric information about the scanning interferometry imaging system comprises a pre-established value for an obliquity factor for the interference objective.

20. The scanning interferometry imaging system of claim 16, wherein the interference objective is a Michelson objective.

21. The scanning interferometry imaging system of claim 16, wherein the interference objective is an unobscured objective.

22. The scanning interferometry imaging system of claim 16, wherein the scanning interferometry imaging system is a scanning interferometry microscope.

23. A non-transitory computer readable medium encoded with instructions that when executed by a data processing apparatus cause the data processing apparatus to perform operations comprising:
  scanning an optical path length difference between measurement light and reference light at a detector, where the measurement and reference light is light derived from a common source and directed along different paths before being overlapped on the detector using a scanning interferometry imaging system, the measurement and reference light having a narrowband wavelength spectrum;
  acquiring intensity data using the detector while scanning the optical path length difference, the intensity data being acquired at a frame rate and the scanning being performed at a scan speed;
  determining information about the scan speed based on the acquired intensity data, geometric information about the scanning interferometry imaging system, and the narrowband wavelength spectrum; and
  calibrating the scanning interferometry imaging system based on the information about the scan speed,
  wherein, during the scanning, the measurement light reflects from an object and the scanning interferometry imaging system is arranged to image the object to the detector.

* * * * *

UNITED STATES PATENT AND TRADEMARK OFFICE
CERTIFICATE OF CORRECTION

PATENT NO. : 9,958,254 B2
APPLICATION NO. : 14/822975
DATED : May 1, 2018
INVENTOR(S) : Peter J. de Groot et al.

Page 1 of 1

It is certified that error appears in the above-identified patent and that said Letters Patent is hereby corrected as shown below:

On the Title Page

Column 1 (Assignee), Line 1, delete "Middlfield," and insert -- Middlefield, --

In the Claims

<u>Column 16</u>
Line 48, in Claim 16, after "speed" insert -- , --

Signed and Sealed this
Eighteenth Day of September, 2018

Andrei Iancu
*Director of the United States Patent and Trademark Office*